United States Patent [19]

Jahnke

[11] Patent Number: 4,889,657

[45] Date of Patent: Dec. 26, 1989

[54] PARTIAL OXIDATION PROCESS

[75] Inventor: Frederick C. Jahnke, Rye, N.Y.

[73] Assignee: Texaco Inc., White Plains, N.Y.

[21] Appl. No.: 288,213

[22] Filed: Dec. 22, 1988

[51] Int. Cl.$^4$ .......................... C01B 3/36; C01B 3/02
[52] U.S. Cl. .................................. 252/373; 48/197 R
[58] Field of Search ....................... 252/373; 48/197 R

[56]  References Cited

U.S. PATENT DOCUMENTS 4,436,530  3/1984  Child et al. ..................... 48/197 R Primary Examiner—Howard T. Mars
Attorney, Agent, or Firm—Robert A. Kulason; James J. O'Loughlin; Albert Brent

[57]  ABSTRACT

The hot effluent gas stream comprising $H_2 + CO$ and entrained molten slag and ash from the partial oxidation of an ash-containing heavy liquid hydrocarbonaceous fuel, an ash-containing solid carbonaceous fuel, or mixtures thereof is passed in succession through a radiant cooling zone, a metal gas transfer line with internal metal heat transfer surfaces, and a convection cooling zone. By maintaining the internal metal heat transfer surfaces of the gas transfer line where turbulent flow of gas stream occurs at a temperature in the range of about 150° F. to below 700° F. by noncontact heat exchange with a coolant, substantially no molten slag or ash sticks to the metal heat transfer surfaces on the inside of the gas transfer line. Simultaneously, where laminar flow of the gas stream within the gas transfer line occurs, slag and ash entrained in the gas stream is prevented from sticking to the inside metal heat transfer surfaces of the gas transfer line by maintaining the temperature of said inside surfaces in the range of about 700° F. to 1,200° F. by noncontact heat exchange with a coolant.

30 Claims, No Drawings

PARTIAL OXIDATION PROCESS

FIELD OF THE INVENTION

This invention relates to a process for the partial oxidation of an ash-containing heavy liquid hydrocarbonaceous, an ash-containing solid-carbonaceous fuel, or mixtures thereof to produce an effluent gas stream comprising $H_2+CO$ and entrained molten slag and ash at a temperature in the range of about 2000° F. to 3000° F. More specifically it pertains to the improvement in transporting, the partially cooled effluent gas stream from the partial oxidation reaction zone through a gas transfer line connecting a radiant cooling zone with a convection cooling zone while preventing molten slag and ash entrained in the effluent gas stream from sticking to the heat transfer surface on the inside of the gas transfer line.

BACKGROUND OF THE INVENTION

The partial oxidation process is a well known process for converting liquid hydrocarbonaceous and solid carbonaceous fuels into synthesis gas reducing gas, and fuel gas, i.e. gaseous mixture comprising $H_2+CO$. See coassigned U.S. Pat. Nos. 3,988,609 and 4,251,228 for example, which are incorporated herein by reference.

Ash-containing heavy liquid hydrocarbonaceous fuels i.e. reduced crude oil and ash-containing solid carbonaceous fuels i.e. coal or petroleum coke are desirable low-cost feedstocks for the partial oxidation process. However, when these fuels are used, the hot effluent gas stream from the reaction zone contains an increased amount of entrained molten slag and ash. In designs for the partial oxidation synthesis gas process that include a radiant and a convection gas cooler which are connected by a gas transfer line, the molten slag and ash entrained in the effluent gas stream may deposit on the inside walls of the gas transfer time. Over a period of time, the build-up of these deposits, which usually take place at areas of high turbulence, may lead to plugging in the gas transfer time. This problem and others may be avoided by the subject process thereby resulting in reduced downtime and lower maintenance costs. Convectively cooling partially cooled synthesis gas in a water jacketed transfer line convection cooler is described in coassigned U.S. Pat. No. 4,436,530, which is incorporated herein by reference. However, this scheme does not address applicants' problem of preventing the build-up of slag and ash deposits in sections of the gas transfer line where high gas turbulence occurs. Nor is heat recoverable at two different temperature ranges from the gas stream passing through the gas transfer line.

SUMMARY OF THE INVENTION

In accordance with certain aspects of the invention there is provided in a process for the partial oxidation of an ash-containing heavy liquid hydrocarbonaceous fuel, an ash-containing solid carbonaceous fuel, or mixtures thereof to produce an effluent gas stream having a temperature in the range of about 2000° F. to 3000° F. and comprising $H_2+CO$ entrained molten slag and ash; and cooling said effluent gas stream by passing said gas stream in succession through a radiant cooling zone, a gas transfer line with internal heat transfer surfaces, and a convection cooling zone; the improvement for preventing said molten slag and ash from sticking in the heat transfer surfaces on the inside of said gas transfer line comprising: cooling the internal heat transfer surfaces of said gas transfer line where high gas turbulence occurs to a temperature in the range of about 150° F. to below 700° F.

In another embodiment of the process, simultaneously, in different locations within the gas transfer line, both high gas turbulence and laminar flow takes place. In such case, the internal heat transfer surfaces of the gas transfer line where laminar gas flow occurs are maintained at a higher temperature than that of the heat transfer surfaces on the inside of the gas transfer line where high gas turbulence occurs. This higher temperature is usually in the range of about 700° F. to 1,200° F.

DESCRIPTION OF THE INVENTION

The term ash-containing liquid hydrocarbonaceous material or fuel feed to the partial oxidation process is by definition a petroleum or coal derived fuel selected from the group consisting of virgin crude, reduce crude, vacuum tower bottoms or feeds, residual fuel oil, decanted oil from a catalytic cracker, heavy fuel oil slurry, heavy gas oils, asphalt, tar sands bitumen, shale oil, coal derived oil, and mixtures thereof.

The term ash-containing solid carbonaceous material or fuel feed to the partial oxidation process is by definition coal including anthracite, bituminous, sub-bituminous, and lignite; coal liquefication solid residue; petroleum coke, organic waste material, asphaltic bitumen; and mixtures thereof.

The preferable particle size of the comminuted solid carbonaceous fuel is such that substantially all e.g. about 95 wt. % or more of the material passes through a sieve of the size in the range of ASTM E-11 Standard Sieve Designation about 425 microns to 38 microns, or below. In one embodiment, the solid carbonaceous fuel is ground together with an ash fusion temperature reducing agent. Intimate mixing of the materials is thereby achieved, and the particle sizes of each material are substantially the same. The ground fuel or fuel mixture is then mixed with water to produce a liquid pumpable slurry. Alternatively, the solid material may be wet ground with the liquid slurry medium. Slurries of solid fuel having a solids content in the range of about 50 to 70 wt. % are then introduced into a partial oxidation gasifier.

The ash-containing fuel is reacted with a free-oxygen containing gas e.g. air, oxygen-enriched air, substantially pure oxygen, in the presence of a temperature moderator e.g. $H_2O$, $CO_2$, $N_2$ in a refractory lined partial oxidation synthesis gas generation zone. The partial oxidation reaction takes place in a reducing atmosphere at a temperature in the range of about 1700° F. to 3000° F., such as about 2200° F. to 2600° F.; and a pressure in the range of about 5 to 250 atmospheres, such as about 15 to 200 atmospheres. When steam or water is used as a temperature moderator, the $H_2$ fuel weight ratio is in the range of about 0.1 to 5.0, such as about 0.2 to 0.9. The atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Molten slag and ash are present in the range of about 0.5 to 35.0 wt. %, such as about 1.0 to 20.0 wt. % (basis total weight of fuel feed). The synthesis gas may be produced in a free-flow partial oxidation reaction zone, such as that shown and described in coassigned U.S. Pat. No. 3,607,157, which is incorporated herein by reference. Ash is the remnant of completely combusted particles of fuel. It is the mineral matter which has not reached the melting point. Molten slag is melted ash. The molten slag and ash entrained in the hot raw effluent gas stream comprising $H_2+CO$ has an initial ash deformation temperature of at least 1500° F., such as in the range of about 1900° F. to 2700° F. such as about 2150° F. to 2400° F.

Ash is discharged from the gasifier as a viscous liquid mixed in with the product gases. The ash is solidified as it is cooled in the radiant cooler. A major problem is encountered when portions of the ash are of a low melting species. Thus, even after cooling to the minimum reasonable temperature with radiant heat transfer, this portion of ash may still be sticky and may cause agglomeration of the nonmolten ash particles. In other words, the melt acts as a glue to bind ash particles together and against the inner surface of the gas transfer lines. If the gasifier is run long enough, this situation typically results in a blockage large enough to disrupt normal operations. As indicated by the ASTM Test for Fusibility of Coal and Coke Ash (D1857) results (see Table I); the ash produced from one type of delayed petroleum coke feedstock undergoes a change at a relatively low temperature of 1515° F. (the initial deformation temperature) indicating the presence of low melting components.

TABLE I

| Delayed Coke Fly-Ash Fusibility Points (from ASTM Test D1857) | |
|---|---|
| Temperature | °F. |
| Initial Deformation | 1515 |
| Softening | 2630 |
| Hemispherical | 2650 |
| Fluid | 2700+ |

Closer study of the ashes derived from the partial oxidation, without an additive, for a feedstock comprising heavy liquid hydrocarbonaceous fuels and/or petroleum coke having nickel and vanadium-containing ashes shows that they are largely composed of oxide and sulfide compounds of vanadium, nickel, iron, along with some normally occurring mineral matter species. Vanadium-containing oxide laths are present including V, V+Ca, V+Fe, V+Al, and mixtures thereof. Vanadium-containing spinels are present of the spinel-type aluminate phases and may include metals selected from the group consisting of V, Fe, Cr, Al, Mg and mixtures thereof. The ash from coal comprises $SiO_2$ about 58–63 wt. % and $Al_2O_3$ about 15–20 wt. %. While petroleum coke comprises about 0.2 wt. % ash, coal comprises about 10–20 wt. % ash.

The hot raw process gas stream passes down through the vertical free-flow refractory lined partial oxidation reaction zone carrying entrained molten slag, ash, and particulate matter i.e. soot and char. Soot is carbon produced by the partial oxidation of liquid hydrocarbon fuel. Char is devolatilized and partially combusted solid carbonaceous fuel particles comprising ash and carbon. The effluent gas stream leaves the reaction zone by way of a central axially aligned outlet in the bottom of the reaction zone.

The temperature of the effluent gas stream is partially reduced by passing the gas stream down through an axially aligned vertical radiant cooling zone located below the reaction zone. The radiant cooling zone comprises at least one ring of vertical water cooled tubes, such as shown and described in coassigned U.S. Pat. No. 4,377,132, which is incorporated herein by reference. About 50 to 95 wt. % of the molten slag, ash and particulate matter drop out of the gas stream and are quenched in a water bath located below the radiant cooling zone and usually in the same vessel. Quench water containing particles of solid slag, ash, and particulate matter is removed periodically by means of a conventional lock hopper such as shown and described in coassigned U.S. Pat. No. 4,533,363, which is incorporated herein by reference. This slurry is replaced by fresh water.

Partially cooled raw synthesis gas, reducing gas, or fuel gas, depending on the gas analysis, leaves by way of an outlet in the side wall of the radiant cooler at a temperature in the range of about 900° F. to 1500° F. The gas stream then passes through a gas transfer line which connects to a convection cooler. Any suitable convection cooler may be used. For example, see coassigned U.S. Pat. Nos. 4,462,339 and 4,488,513 which are incorporated herein by reference. The temperature of the gas stream is reduced further in the convection cooler, for example to a temperature in the range of about 350° F. to 750° F., by noncontact heat exchange with boiler feed water. The cooled gas may be then scrubbed by means of a conventional gas scrubber, such as shown and described in coassigned U.S. Pat. No. 4,559,061, which is incorporated herein by reference.

By the effluent gas stream flowing through the gas transfer line connecting the radiant cooler with the convection cooler at a velocity in the range of about 10 to 100 ft. per second, high gas turbulence occurs in the gas transfer line where the pipe bends e.g. at 45° and/or 90° elbows. The term and/or means any one of the members or mixtures thereof. At these locations molten slag and ash entrained in the effluent gas stream deposit on the inside walls of the gas transfer line. Over a period of time, the build-up of these deposits on the inside heat transfer surfaces of the gas transfer line are such that the gas can no longer be passed through the gas transfer line. This condition may lead to by-pass of the convection cooler (with loss of efficiency), or to unit shutdown. The sticking phenomenon involves mass transfer of the molten slag and ash particles to the duct walls, adherence of the particles to the walls, ash sintering (partial melting) to form a hard strong, fused mass. It is postulated that the sticking is due to high turbulence and the resulting high heat transfer rate in the narrow gas transfer line. The sintering, which makes the deposit strong enough to resist removal by gas pressure, is also caused by high temperature of the inside walls of the gas transfer line.

By the subject invention, molten slag and ash entrained in the raw effluent gas stream produced by the partial oxidation of an ash-containing heavy liquid hydrocarbonaceous fuel, an ash-containing solid carbonaceous fuel, and mixture thereof may be prevented from sticking and build-up on the inside metal surface or surfaces of a gas transfer line where high gas turbulence occurs by cooling the internal metal heat transfer surfaces of the gas transfer line to a temperature in the range of about 150° F. to below 700° F. By the subject invention, substantially no molten slag, ash, or mixture thereof deposits out on the inside metal walls of the gas transfer line. The temperature of the gas stream entering the gas transfer line may be in the range of about 900° F. to 1500° F. The Reynolds Number for the raw effluent gas stream passing through the gas transfer line is in the range of greater than 2,000 to 100,000 in the turbulence transition zone where high gas turbulence occurs, such as in bends or other disturbences to a straight passage. The Reynolds Number (R) of the effluent gas stream passing through the laminar gas flow area, such as in straight lines, is less than about 50,000.

The internal metal heat transfer surfaces of the gas transfer line are maintained at the proper temperature to prevent sticking and build-up of the molten slag and ash by passing a coolant through a hollow passage or passages in the wall of the gas transfer line where high gas turbulence occurs. Alternatively, the coolant may be passed through cooling coils that encircle the external wall of the gas transfer line where the gas flows on the inside of the line with high gas turbulence. In another embodiment, the gas transfer line is a double-wall conduit comprising two equally spaced concentric metal conduits providing a hollow passage for the flow of coolant between the inner wall of the outer conduit and the outer wall of the inner conduit. The hot effluent gas stream passes through the inner conduit. Blank solid walls divide the hollow passages into at least one passage located behind the heat transfer surface of the inner conduit. Inlet and outlet pipes are connected to each passage for respectively introducing cold coolant and removing warmed coolant. For example, cold coolant may pass through the inlet pipe at the bottom of each passage and warmed coolant may leave through an outlet pipe at the upper portion of the passage. The passage in the double-wall conduit may provide flow of coolant through any of the following: straight runs, bends, elbows, and mixtures thereof.

In still another embodiment, the gas transfer line may comprise at least one zone A where high gas turbulence occurs and at least one zone B where more laminar gas flow occurs. Zones A, B, and mixtures thereof are preferably connected in series with each other. Zone A includes pipe bends and/or elbows e.g. 45° and 90° elbows, whereas zone B comprises a straight run of pipe. Ordinarily, molten slag and ash would deposit out and build-up on the metal heat transfer surfaces of zone A; but not on the metal heat transfer surfaces of zone B. However, by cooling the heat transfer surfaces of each zone A to a temperature in the range of about 150° F. to below 700° F. by noncontact heat exchange with a first coolant as described previously, there is substantially no depositing and build-up of molten slag, ash, or mixtures thereof on the internal metal heat transfer surfaces of zone A in the gas transfer line. In similar manner, the internal metal heat transfer surfaces of the remainder of the gas transfer line where laminar flow occurs e.g. each zone B are maintained at a temperature in the range of about 700° F. to 1,200° F. by noncontact heat exchange with a second coolant. There is substantially no depositing and build-up of molten slag and/or ash on the internal metal heat transfer surfaces of zone B in the gas transfer line. By this means, heat may be abstracted from the raw effluent gas stream flowing in the gas transfer line at two different temperature ranges at a great thermal efficiency. Zones A and B may be made from the three types of construction for the passage of coolant in noncontact heat exchange with the hot gas stream as previously described: (1) by way of a hollow passage in the wall of the metal gas transfer line, (2) by way of a metal cooling coil surrounding the outside wall of the metal gas transfer line, and (3) by way of a double-wall conduit construction including either straight runs, bends, elbows, and mixtures thereof.

While the first and second coolants for zones A and B respectively, may be the same type of material, after being used as heat transfer mediums the warmed streams of first and second coolants are not mixed together. In the case of a plurality of A zones, the first coolant may be passed in series and/or parallel through all of the A zones. Simultaneously, the second coolant may be passed in series and/or parallel through all of B zones. Any suitable gaseous, liquid, or boiling liquid heat transfer fluid may be used as the coolant including boiler feed water, steam, hydrocarbons, helium, nitrogen, and argon. The raw effluent gas stream and any coolant stream passing in heat exchange with each other may be passed in the same or opposite directions.

The process of the invention has been described generally and by examples with reference of materials of particular compositions for purposes of clarity and illustration only. It will be apparent to those skilled in the art from the foregoing that various modifications of the process and materials disclosed wherein can be made without departure from the spirit of the invention.

I claim:

1. In a process for the partial oxidation of an ash-containing heavy liquid hydrocarbonaceous fuel, an ash-containing solid carbonaceous fuel, or mixtures thereof to produce an effluent gas stream having a temperature in the range of about 2000° F. to 3000° F. and comprising $H_2$ +CO and entrained molten slag and ash; and cooling said effluent gas stream by passing said gas stream in succession through a radiant cooling zone, a metal gas transfer line with internal metal heat transfer surfaces, and a convection cooling zone; the improvement for preventing said molten slag and ash from sticking to the metal heat transfer surfaces on the inside of said gas transfer line comprising: cooling the internal metal heat transfer surfaces of said metal gas transfer line where high gas turbulence occurs to a temperature in the range of about 150° F. to below 700° F. by noncontact heat exchange with a coolant.

2. The process of claim 1 wherein said cooling is provided by passing a coolant through a hollow passage or passages in the wall of said gas transfer line where said high gas turbulence occurs.

3. The process of claim 1 wherein said cooling is provided by passing a coolant through a metal cooling coil surrounding the outside wall of said metal gas transfer line where said high gas turbulence occurs.

4. The process of claim 1 wherein said gas transfer line comprises a double-wall conduit comprising two equally spaced concentric metal conduits including metal bends and/or elbows; and wherein said cooling is provided by passing a coolant through a hollow passage between the inner wall of the outer conduit and the outer wall of the inner conduit.

5. The process of claim 1 wherein said high gas turbulence occurs at bends and/or elbows in said gas transfer line.

6. The process of claim 1 wherein the Reynolds Number (R) of the effluent gas stream passing through the high gas turbulent area is in the range of greater than 2,000 to 100,000.

7. The process of claim 1 wherein the temperature of the gas stream entering said gas transfer line is in the range of about 900° F. to 1500° F.

8. The process of claim 1 wherein said gas transfer line comprises a double-wall metal conduit providing a hollow passage for the flow of coolant and with blank walls dividing the hollow passages into at least one passage located behind the metal heat transfer surfaces; and inlet and outlet pipes connected to each passage for respectively introducing cold coolant and removing warmed coolant; and wherein a cold coolant passes through the inlet pipes at the bottom of each passage and warmed coolant leaves through outlet pipes at the upper portion of each passage.

9. The process of claim 1 wherein about 50 to 95 wt. % of the entrained slag is removed from the effluent gas stream prior to the effluent gas stream entering said gas transfer line.

10. The process of claim 1 wherein substantially no molten slag, ash, or mixtures thereof deposits out on the inside walls of said gas transfer lines.

11. The process of claim 1 wherein said ash-containing solid carbonaceous fuel is selected from the group consisting of coal, coke from coal, petroleum coke, and mixtures thereof.

12. The process of claim 1 wherein said ash-containing heavy liquid hydrocarbonaceous fuel is selected from the group consisting of crude residue from petroleum distillation, reduced crude, whole crude, asphalt, coal tar, coal derived oil, shale oil, tar sand oil, and mixtures thereof.

13. The process of claim wherein said coolant is a gaseous or liquid or boiling liquid heat transfer fluid.

14. The process of claim 1 wherein said coolant is selected from the group consisting of boiler feed water, steam, hydrocarbons, helium, nitrogen, and argon.

15. In a process for the partial oxidation of an ash-containing heavy liquid hydrocarbonaceous fuel, an ash-containing solid carbonaceous fuel, or mixtures thereof to produce an effluent gas stream having a temperature in the range of about 2000° F. to 3000° F. and comprising $H_2 + CO$ and entrained molten slag and ash; and cooling said effluent gas stream by passing said gas stream in succession through a radiant cooling zone, a metal gas transfer line with internal metal heat transfer surfaces, and a convection cooling zone; the improvement for preventing said molten slag and ash from sticking to the heat transfer surfaces on the inside of said gas transfer line comprising: (1) cooling the internal metal heat transfer surfaces of said gas transfer line where high gas turbulence occurs to a temperature in the range of about 150° F. to below 700° F. by noncontact heat exchange with a coolant; and (2) simultaneously maintaining the internal metal heat transfer surfaces of the remainder of the gas transfer line where laminar gas flow occurs at a temperature in the range of about 700° F. to 1,200° F. by noncontact heat exchange with a coolant.

16. The process of claim 15 wherein the cooling in (1) is provided by passing a first coolant through hollow passages in the gas transfer line; and the temperature of the internal heat transfer surface in (2) is maintained by passing a second coolant through other hollow passages in the gas transfer line.

17. The process of claim 15 wherein the high gas turbulence in (1) occurs in a plurality of A zones in said gas transfer line, and the laminar gas flow in (2) occurs in a plurality of B zones in said gas transfer line; and wherein said first coolant is passed through the hollow passages in the gas transfer line in all of the A zones connected in series, and said second coolant is passed through the hollow passages in the gas transfer line in all of the B zones connected in series.

18. The process of claim 15 wherein the cooling in (1) is provided by passing a first fluid through a metal cooling coil surrounding the outside wall of said metal gas transfer line where said high gas turbulence occurs on the inside of said line; and the wall temperature in (2) is provided by passing a second fluid through a metal coil surrounding the outside wall of said metal gas transfer line where laminar gas flow occurs on the inside of said line.

19. The process of claim 15 wherein the temperature of the heat exchange surfaces in (2) is controlled by noncontact heat exchange between boiler feed water which is converted into steam passing through the transfer line; and wherein heat is recovered in (2) at a higher and more valuable temperature level than the heat recovered in (1).

20. The process of claim 15 wherein said high gas turbulence in (1) occurs at bends and/or elbows in said gas transfer line.

21. The process of claim 15 wherein said gas transfer line comprises a double-wall conduit comprising two equally spaced concentric straight run metal conduits in (2) and metal bends and/or elbows in (1); and wherein the cooling in (1) is provided by passing a first coolant through a hollow passage between the inner wall of the outer conduit and the outer wall of the inner conduit of that portion of the gas transfer line in (i), and the cooling in (2) is provided by passing a second coolant through a hollow passage between the inner wall of the outer conduit and the outer wall of the inner conduit of that portion of the gas transfer line in (2).

22. The process of claim 15 wherein the Reynolds Number (R) of the effluent gas stream passing through the high gas turbulent area in (1) is in the range of greater than 2,000 to 100,000; and the Reynolds Number (R) of the effluent gas stream passing through the laminar gas flow area in (2) is less than about 50,000.

23. The process of claim 15 wherein the temperature of the gas stream entering said gas transfer line is in the range of about 900° F. to 1500° F.

24. The process of claim 15 wherein said gas transfer line comprises a double-wall metal conduit providing hollow passages with blank walls dividing said hollow passages into at least one passage located behind the metal heat transfer surfaces in (1), and at least one passage located behind the metal heat transfer surfaces in (2); and inlet and outlet pipes connected to each passage; and where in (1) a coolant passes through the inlet pipes at the bottom of each passage and leaves through outlet pipes at the upper portion of said first chamber; and where in (2) high pressure hot boiler feed water passes through an inlet pipe at the bottom of at least one second passage and leaves through an outlet pipe at the upper portion of each second passage as high pressure wet steam.

25. The process of claim 15 wherein about 50 to 95 wt. % of the entrained slag is removed from the effluent gas stream prior to the effluent gas stream entering said gas transfer line.

26. The process of claim 15 wherein substantially no molten slag, ash, or mixtures thereof deposits out in the inside walls of said gas transfer lines.

27. The process of claim 15 wherein said ash-containing solid carbonaceous fuel is selected from the group consisting of coal, coke from coal, petroleum coke, organic waste materials, and mixtures thereof.

28. The process of claim 15 wherein said coolant is a gaseous or liquid, or boiling liquid heat transfer fluid.

29. The process of claim 15 wherein said coolant is selected from the group consisting of boiler feed water, hydrocarbons, steam, helium, nitrogen, and argon.

30. The process of claim 15 wherein said ash-containing heavy liquid hydrocarbonaceous fuel is selected from the group consisting of crude residue from petroleum distillation, reduced crude, whole crude, asphalt, coal tar, coal derived oil, shale oil, tar sand oil, and mixtures thereof.

* * * * *